United States Patent [19]

Johann et al.

[11] Patent Number: 5,285,568
[45] Date of Patent: Feb. 15, 1994

[54] APPARATUS FOR THE AUTOMATIC INSTALLATION OF EXPANDER RINGS INTO SPLIT PISTON RINGS

[75] Inventors: Walter Johann, Wermelskirchen; Reiner Kierst, Bergisch-Gladbach, both of Fed. Rep. of Germany

[73] Assignee: Goetze AG, Burscheid, Fed. Rep. of Germany

[21] Appl. No.: 63,556

[22] Filed: May 19, 1993

[30] Foreign Application Priority Data

May 20, 1992 [DE] Fed. Rep. of Germany ....... 4216652

[51] Int. Cl.⁵ .................. B23Q 7/10; B23P 19/04
[52] U.S. Cl. .......................... 29/809; 29/229
[58] Field of Search ............... 29/229, 809, 450, 451, 29/453, 464, 468, 888.07

[56] References Cited

U.S. PATENT DOCUMENTS

| | | | |
|---|---|---|---|
| 2,840,892 | 7/1958 | Erdmann | 29/809 |
| 3,365,782 | 1/1968 | Maderia | 29/229 |
| 4,532,706 | 8/1985 | Horn | 29/809 |

FOREIGN PATENT DOCUMENTS

| | | | |
|---|---|---|---|
| 211228 | 7/1984 | Fed. Rep. of Germany | 29/229 |
| 218581 | 2/1985 | Fed. Rep. of Germany | 29/229 |
| 245614 | 5/1987 | Fed. Rep. of Germany | 29/229 |
| 57-1628 | 1/1982 | Japan | 29/229 |

Primary Examiner—P. W. Echols
Assistant Examiner—David P. Bryant
Attorney, Agent, or Firm—Spencer, Frank & Schneider

[57] ABSTRACT

An apparatus for inserting an expander ring into an inner circumferential groove of a split piston ring includes a first magazine for storing a stack of piston rings; and a second magazine for storing a stack of expander rings. The second magazine has a discharge end and a longitudinal axis coinciding with a longitudinal axis of the expander ring stack. There are further provided a device for displacing a piston ring from the first magazine into axial alignment with the longitudinal axis of the second magazine at the discharge end thereof; a spreader device for radially outwardly spreading the piston ring positioned at the discharge end; and a pusher for pushing an expander ring from the second magazine parallel to the longitudinal axis into the piston ring spread-open by the spreader device.

6 Claims, 1 Drawing Sheet

APPARATUS FOR THE AUTOMATIC INSTALLATION OF EXPANDER RINGS INTO SPLIT PISTON RINGS

CROSS REFERENCE TO RELATED APPLICATION

This application claims the priority of German Application No. P 42 16 652.7 filed May 20, 1992, which is incorporated herein by reference.

BACKGROUND OF THE INVENTION

This invention relates to an apparatus for the automatic installation of expander rings into a circumferential ring groove of split piston rings, particularly oil scraping piston rings. The piston rings and the expander rings are stored in separate magazines and may be dispensed individually therefrom.

The preparation of piston rings requires a significant number of different, mutually coordinated processes. In case of large numbers of piston rings to be prepared, the output is dependent from the working speed of the individual processes. For treating the running faces, the piston rings are, for example, polished in a polishing (lapping) sleeve. The discontinuous piston ring exerts a radially outwardly directed force so that it engages the inner circumferential surface of the polishing sleeve with a defined inherent stress which depends from the ring geometry. Based on such a geometry, in some piston rings the inherent stress is insufficient for providing a satisfactory treatment of the running faces. For this reason, in piston rings having only a slight inherent stress, expander rings are inserted into the inner ring groove. Since such a process is conventionally performed manually, the manufacturing costs are very significantly increased.

German Offenlegungsschrift (application published without examination) 24 40 996 discloses an apparatus for installing split safety rings into ring grooves of cylindrical workpieces. The safety rings to be installed are stored in a stacked state in a magazine and are individually ejected therefrom for insertion on a spreader mandrel. The installation of spreader rings into piston rings, however, cannot be performed with such an apparatus.

SUMMARY OF THE INVENTION

It is an object of the invention to provide an improved apparatus for the automatic installation of spreader rings into piston ring grooves.

This object and others to become apparent as the specification progresses, are accomplished by the invention, according to which, briefly stated, the apparatus for inserting an expander ring into an inner circumferential groove of a split piston ring includes a first magazine for storing a stack of piston rings; and a second magazine for storing a stack of expander rings. The second magazine has a discharge end and a longitudinal axis coinciding with a longitudinal axis of the expander ring stack. There are further provided a device for displacing a piston ring from the first magazine into axial alignment with the longitudinal axis of the second magazine at the discharge end thereof; a spreader device for radially outwardly spreading the piston ring positioned at the discharge end; and a pusher for pushing an expander ring from the second magazine parallel to the longitudinal axis into the piston ring spread-open by the spreader device.

The above-outlined apparatus thus makes possible to automatically provide piston rings with spreader rings. The spreader ring magazine is preferably a tubular sleeve which is vertically oriented so that the spreader rings are superposed in axial alignment. The piston rings are positioned by means of a pusher at the ejection end of the spreader ring magazine. A spreading device, formed of two semicircular spreader jaws, engages the ring groove edges and spreads the piston ring radially apart to such an extent that the spreader rings, upon ejection from their magazine, are automatically seated in the ring groove.

DESCRIPTION OF THE PREFERRED EMBODIMENT

Figure 1:
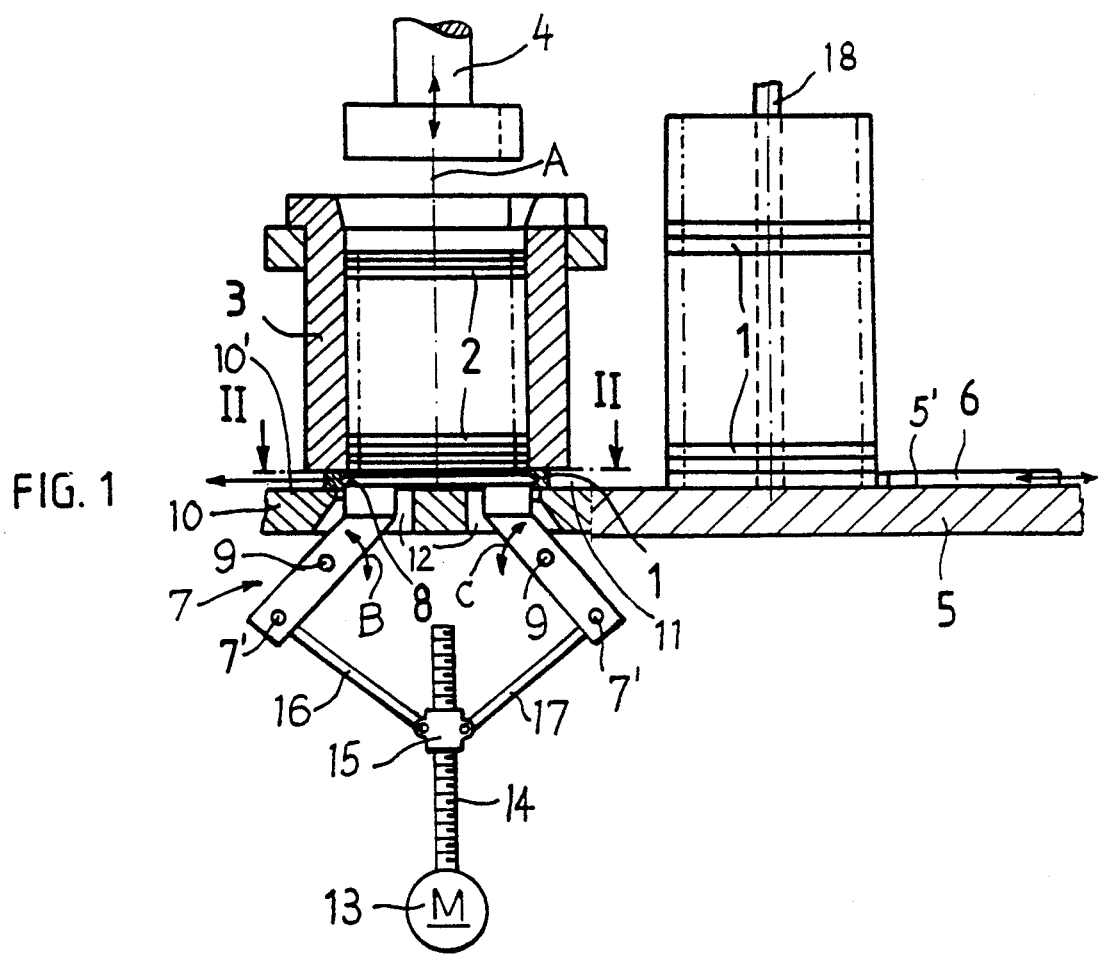
FIG. 1 is a schematic sectional side elevational view of a preferred embodiment of the invention.
Figure 2:
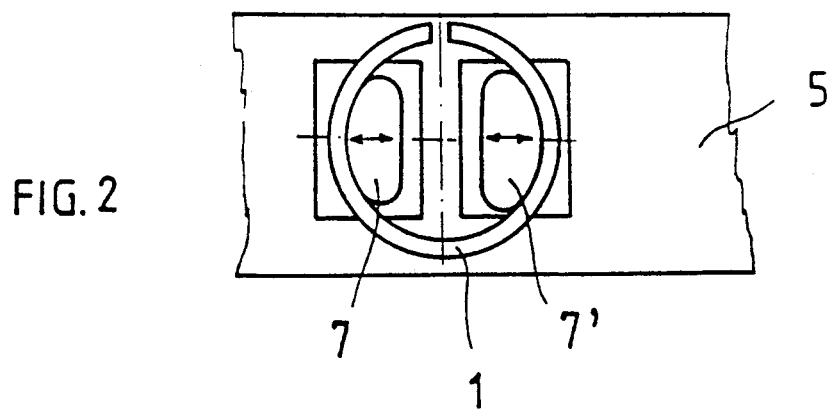
FIG. 2 is a top plan view taken along line II—II.

Turning to FIGS. 1 and 2, the piston rings 1 to be fitted internally with spreader rings 2 are vertically stacked in an axial alignment in a holder or magazine 18 and are supported on an upper face 5' of a base plate 5. Adjacent to the piston ring stack 1 there is arranged a sleeve-like magazine 3 which has a vertically-oriented longitudinal axis A and in which the spreader rings 2 are stacked and may be dispensed from the magazine 3 individually by means of a pusher 4 onto the top surface 10' of a base plate 10. The spreader rings 2 may be held in the magazine 3 in a slightly compressed state so that they engage frictionally the inner walls of the magazine 3. A pusher slide 6 movable along the surface 5' of the base plate 5 towards and away from the magazine 3 individually displaces the bottom piston ring 1 from the piston ring stack into the dispensing zone of the magazine 3 in such a manner that the piston ring 1 is positioned in axial alignment with the axis A of the spreader ring magazine 3.

Axially underneath the magazine 3 and thus axially underneath the inserted piston ring 1 a spreader device 7 is situated which comprises two spreader jaws 7', each pivotal about a pivot shaft 9 as indicated by the double-headed arrows B and C. The spreader jaws 7' extend through respective throughgoing apertures 12 provided in the base plate 10. As seen in FIG. 2, the spreader jaws 7' have an arcuate, convex working surface shaped to conform to the inner arcuate face of the piston rings 1.

For pivoting the spreader jaws 7' simultaneously and in an opposite direction respective to one another, a motor 13 drives a threaded spindle 14 on which travels a nut 15 to which linkages 16 are articulated at 17. The linkages, in turn, are articulated, at their end remote from the nut 15, to the respective spreader jaw 7'. Thus, for moving the spreader jaws 7' into the operational (spreading) position, the motor 13 is driven such that the nut 15 travels downwardly and, conversely, for a release movement of the spreader jaws 7', the motor 13 is driven such that the nut 15 travels upwardly on the spindle 14, as viewed in FIG. 1.

In the description which follows, the operation of the above-described apparatus will be set forth.

In the starting phase the spreader jaws 7' are pivoted into a respective withdrawn position which leaves the clearance 11 between the bottom radial face of the magazine 3 and the top face 10' of the support base 10 unobstructed.

The pusher 6 displaces the bottom piston ring 1 towards the left into the clearance 11 until the piston ring arrives in an axial alignment with the magazine 3.

Thereafter, the spreader jaws 7' are simultaneously and in an opposite direction pivoted such that they project into the clearance 11 and engage, at diametrically opposite locations, the lower edge of the inner circumferential ring groove 8. Upon further simultaneous pivotal displacement of the spreader jaws 7', the split piston ring 1 is opened to such an extent that the spread-apart piston ring 1 will have an inner diameter which at all locations will be greater than the outer diameter of the spreader rings 2 in their position in the magazine sleeve 3.

Thereafter the plunger 4 is actuated to push the entire stack of spreader rings 2 towards the support plate 10 to such an extent that the lowermost spreader ring 2 in the magazine sleeve 3 is ejected from the magazine sleeve 3 and inserted into the piston ring groove 8 of the spread-open piston ring 1. In case the spreader ring 2 is of the type that is resilient radially outwardly, the spreader ring snaps by itself into the ring groove 8 of the expanded piston ring 1. If the spreader ring is a tubular spring ring, a resilient engagement between the piston ring and the spreader ring occurs only after releasing the spreader jaws 7'.

As the spreader jaws 7' are pivoted into their withdrawn position out of engagement with the lower circumferential edge of the piston ring groove 8, they allow the piston ring 1 to radially contract and to assume its position of equilibrium in cooperation with the spreader ring 2 seated in the piston ring groove 8.

Thereafter, the piston ring/spreader ring assembly is, for example by a non-illustrated ejector, pushed out from under the sleeve magazine 3, allowing the installation cycle to be repeated by the insertion of a new piston ring 1 by the pusher 6.

It will be understood that the above description of the present invention is susceptible to various modifications, changes and adaptations, and the same are intended to be comprehended within the meaning and range of equivalents of the appended claims.

What is claimed is:

1. An apparatus for inserting an expander ring into an inner circumferential groove of a split piston ring, comprising
   (a) a first magazine for storing a stack of piston rings;
   (b) a second magazine for storing a stack of expander rings; said second magazine having a discharge end and a longitudinal axis coinciding with longitudinal axis of the expander ring stack;
   (c) means for displacing a piston ring from said first magazine into axial alignment with said longitudinal axis of said second magazine at said discharge end thereof;
   (d) spreader means for radially outwardly spreading the piston ring positioned at said discharge end; and
   (e) pusher means for pushing an expander ring from said second magazine parallel to said longitudinal axis into the piston ring spread-open by said spreader means.

2. The apparatus as defined in claim 1, wherein said second magazine comprises a tubular sleeve.

3. The apparatus as defined in claim 2, wherein said tubular sleeve has a vertical orientation.

4. The apparatus as defined in claim 1, wherein said means for displacing a piston ring comprises a pusher slide.

5. The apparatus as defined in claim 1, wherein said spreader means comprises two spreader jaws each having a convex surface for conforming to an inner, concave surface of the piston ring.

6. The apparatus as defined in claim 1, further comprising a base plate having an outer surface situated at a clearance from said discharge end of said second magazine; further wherein said means for displacing a piston ring is arranged for sliding the piston ring on said outer surface into position in said clearance at said discharge end of said second magazine; said base plate having an opening through which said spreader jaws project; said spreader jaws being pivotally supported and having a first position in which said spreader jaws are in a retracted state relative to said outer surface and a second position in which said spreader jaws project beyond said outer surface into said clearance and engage the piston ring supported on said base plate at said discharge end of said second magazine.

* * * * *